(12) United States Patent
Katsuda (10) Patent No.: US 7,177,038 B2
(45) Date of Patent: Feb. 13, 2007

(54) IMAGE FORMING SYSTEM (75) Inventor: Takeo Katsuda, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 936 days.

(21) Appl. No.: 09/745,464

(22) Filed: Dec. 26, 2000

(65) Prior Publication Data
US 2002/0015175 A1 Feb. 7, 2002

(30) Foreign Application Priority Data
Dec. 28, 1999 (JP) .................. 11-374674

(51) Int. Cl.
H04N 1/21 (2006.01)
(52) U.S. Cl. ..................... 358/1.15; 358/403
(58) Field of Classification Search ...... 358/1.15–1.18, 358/1.13, 1.11, 1.1–1.2, 401–403, 405, 452, 358/1.3, 1.9; 709/100–107, 232, 238, 230
See application file for complete search history.

(56) References Cited

U.S. PATENT DOCUMENTS 6,175,831 B1 * 1/2001 Weinreich et al. ............ 707/10
6,313,921 B1 * 11/2001 Kadowaki ................. 358/1.15
6,438,574 B1 * 8/2002 Nagashima ................ 718/102
6,519,048 B1 * 2/2003 Tanaka .................... 358/1.13
6,552,813 B2 * 4/2003 Yacoub ..................... 358/1.1
6,801,935 B2 * 10/2004 Shen ....................... 709/219
6,973,575 B2 * 12/2005 Arnold .................... 713/186
7,076,449 B2 * 7/2006 Tsunenari et al. .......... 705/26

FOREIGN PATENT DOCUMENTS

JP 07-212395 8/1995

* cited by examiner

Primary Examiner—Thomas D. Lee
Assistant Examiner—Stephen Brinich
(74) Attorney, Agent, or Firm—Buchanan Ingersoll & Rooney PC (57) ABSTRACT When image data read by an image reading device are to be transmitted to an image forming device connected to the reading device via a network, confidential transmission can be set. In the case where confidential transmission is set, a password is transmitted to the addressee of the image data by an E-mail. The image forming device performs image formation of the image data under the condition that the password is entered. The image formation is notified to the addresser by an E-mail, and hence the addresser can know that the image has been safely delivered to the addressee.

15 Claims, 5 Drawing Sheets

IMAGE FORMING SYSTEM

RELATED APPLICATION

This application is based on application No. 11-374674 filed in Japan, the entire content of which is hereby incorporated by reference.

BACKGROUND OF THE INVENTION

1. Field of the Invention

The present invention relates to an image communication technique, and more particularly to a technique of transmitting image data obtained by reading an original to a reception system via a network, and forming an image in the reception system.

2. Description of the Related Art

As the development of the network technique, a system has been used in which computers such as personal computers, or work stations (hereinafter, such a computer is referred to as "PC"), a scanner for reading an original, and a printer are connected to one another via a network. Such a system is used as a network copying device or a network facsimile device. A network copying device is a system in which image data that are obtained by reading an original with a scanner are transmitted to a printer to be printed out.

Conventionally, various techniques relating to a network copying device or a network facsimile device have been proposed. For example, a system has been proposed in which, when a facsimile server (reception side) receives facsimile image data addressed to addressees, the reception is notified to the addressees by an E-mail (Japanese Patent Publication (Kokai) No. HEI7-212395).

In the case where image data to be transmitted is provided with a high degree of security, the addresser often wishes to perform a process in which the right of outputting the image is given only to a specific addressee and the contents of the image are not opened to other persons (hereinafter, such a process is referred to as "confidential dealing"). When instructions for confidential dealing are given, a password is set, and only the addressee who knows the password is enabled to perform a printout operation based on the image data.

Even in a system wherein a facsimile server notifies addressees of reception of image data, the transmitting device which transmits image data cannot notify addressees that "image data have been transmitted," or that "image data are going to be transmitted." Furthermore, the addresser cannot know whether a copied original has been delivered to the desired addressee oneself or not. Therefore, the addresser must separately notify by telephone that image data have been transmitted or that image data are going to be transmitted, and check through telephone or the like whether a copied original has been delivered to the specific addressee or not.

In a system wherein, in the case of image data with a high degree of security, only a user who knows the password is enabled to give instructions for a printout operation, the addresser must notify the user of the password. Namely, the addresser must previously notify addressees of their respective passwords. Each time when the passwords are changed, the addresser must notify the addressees of the new passwords. Also when an addressee forgets the password, the addresser must notify the addressee of the password.

As described above, in the conventional art, in addition to transmission of image data, the addresser must additionally perform notification of transmission of image data, checking of acknowledgement, and notification of a password, by using a telephone or other communication means. As a result, the burden on the addresser is increased. Furthermore, there is a fear that the addresser remains to forget to perform such notification and checking.

SUMMARY OF THE INVENTION

It is an object of the invention to solve the above-discussed problems.

It is another object of the invention to reduce a burden of notification that image data have been transmitted, or that image data are going to be transmitted, on an addresser.

It is a further object of the invention to reduce a burden of checking whether a copied original has been delivered to an addressee or not, on an addresser.

It is a still further object of the invention to reduce a burden of notification of a password in the case where image data with a high degree of security is handled, on an addresser.

It is a still further object of the invention to provide an image communication technique in which transmission of image data can be automatically notified from the transmission side to an addressee, and, in the case where image data with a high degree of security is handled, a password can be automatically notified.

These and other objects are attained by an image forming method having the steps of reading an image to obtain image data and producing a password; receiving designation of a destination printer and designation of an addressee; transmitting the image data and the password to the designated printer and transmitting the password to the designated addressee by an E-mail; and if the password transmitted by E-mail is entered into the printer and the password matches the password transmitted together with the image data, performing printing on the basis of the image data.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENT

Hereinafter, embodiments of the invention will be described with reference to the accompanying drawings.

<First Embodiment>

Figure 1:
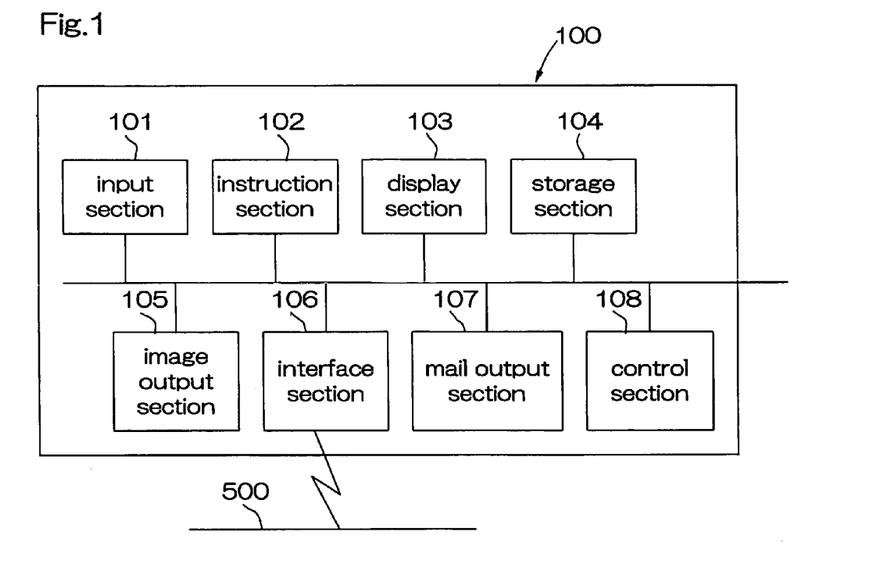
FIG. 1 is a block diagram showing the configuration of an image reading device.

FIG. 1 is a block diagram showing an example of an image reading device to which the invention is applied.

An image reading device 100 is connected to another printer 300 via a network 500. An input section 101 reads an original to produce image data. As a result, the image data are input into the image reading device 100. An instruction section 102 is an operation panel for giving instructions for an operation of the image reading device 100, and has switches and a touch panel which are not shown. In the instruction section 102, instructions for the destination of the input image data are given, and confidential dealing in which only an addressee who knows the password is enabled to perform a printout operation can be set for image data with a high degree of security.

The operation state of the image reading device 100 is displayed on a display section 103. A storage section 104 stores image data which are obtained as a result of the reading of an original by the input section 101, and records information indicative of instructions from the instruction section 102, address information of the printer on the output side, and E-mail address information of the destination of an E-mail.

An image output section 105 outputs the image data via an interface section 106, to a printer 300 which is the destination indicated in the instruction section 102, or an image data receiving device such as a print server which is not shown. In the case where instructions for confidential dealing are given in the instruction section 102, particularly, the image output section 105 sets a password specifying the image data, and adds the set password to the image data. The resulting image data are output to the printer 300 via the interface section 106.

A mail output section 107 transmits an E-mail. The password specifying the image data to be transmitted is attached to the E-mail. The mail output section 107 transmits the produced E-mail via the interface section 106 to the addressee who is allowed to output the image data, specifically, an E-mail address which is used by the addressee. The interface section 106 is an interface through which image data and an E-mail are transmitted and received. Interfaces for the image data and the E-mail may be separately configured.

The password is requested to be entered as a condition for starting image formation based on the image data received by the printer 300. Only when the addressee to whom the password has been informed by the E-mail enters the password into the printer 300, therefore, image formation based on the image data is performed.

A control section 108 controls the whole of the image reading device 100. Particularly, the control section 108 performs a control in which a password is automatically produced in accordance with a process of transmitting image data and the password is transmitted by an E-mail.

Figure 2:
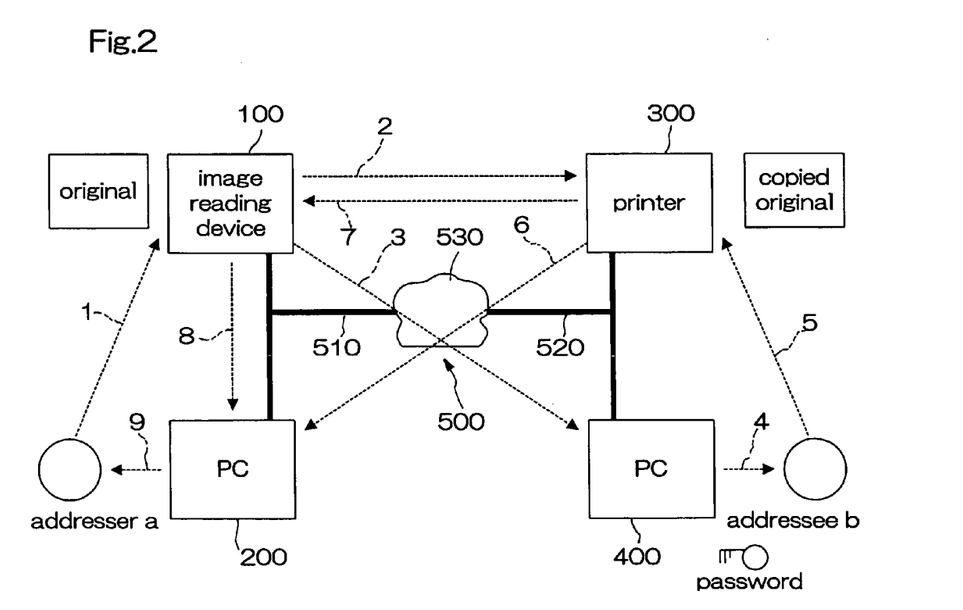
FIG. 2 is a block diagram of a network copying system using the image reading device.

FIG. 2 is a block diagram of a network copying system using the image reading device 100.

The image reading device 100, a PC 200 which is used by an addresser a, the printer 300 on the reception side, and a PC 400 which is used by an addressee b who is enabled to perform a printout operation are connected to one another by a network 500.

The network 500 may be the Internet, a LAN within an organization, or the like. As shown in FIG. 2, the network 500 may be configured by interconnecting networks 510, 520, and 530.

The arrows of broken lines shown in FIG. 2 indicate the order of processes in the network copying system.

The addresser a sets an original into the image reading device 100 (the first arrow). The image reading device 100 reads the original to produce image data. In the case where instructions for confidential dealing are given in the instruction section 102, the image reading device 100 sets a password specifying the image data, and adds the set password to the image data.

The image data to which the password is added is transmitted to the printer 300 (the second arrow). The image data are received by the printer 300, and then stored into a storage region disposed in the printer 300.

In correspondence with the transmission of the image data to the printer 300, the image reading device 100 transmits the password by an E-mail to the E-mail address of the addressee b who is enabled to perform a printing operation based on the image data. The addressee b receives the E-mail by means of the PC 400, a personal data assistant, or the like (the third arrow). As a result, the addressee b knows from the E-mail the fact that image data addressed to the addressee oneself have been received by the printer 300, and also the password which is requested to be entered as a condition for starting image formation based on the image data (the fourth arrow).

The addressee b moves to the place where the printer 300 is placed, and then enters the password notified by the E-mail, into the printer 300 (the fifth arrow). The printer 300 judges whether the password added to the image data matches that entered by the addressee b or not. If the passwords match each other, the printer 300 performs a printout operation based on the received image data.

The addressee may enter the password through a scanning panel of the printer 300 as described above, or alternatively may enter the password into the printer 300 through the own PC which has received the E-mail.

Alternatively, the addressee may transfer the received E-mail to the printer, thereby sending the password to the printer 300. In the alternative, the addressee is not required to type the password through a keyboard or the scanning panel, and also to recognize the password.

Upon completion of the printout, the printer 300 sends a print completion mail. The print completion mail is transmitted as a reply to the PC 200 which is used by the addresser a, in accordance with the E-mail address of the addresser a of the image data (the sixth arrows). Alternatively, the print completion mail may be transferred to the PC 200 via the image reading device 100 (the seventh and eighth arrows). As a result, the addresser a of the image data can know that the printout operation based on the image data has been completed (the ninth arrow).

Persons other than the addressee b to whom the password has been informed by the E-mail cannot give instructions for a printout operation. Therefore, the case where the print completion mail is transmitted as a reply is restricted to that where instructions for the printout operation are given by the addressee b oneself to whom the password has been informed by the E-mail, or by a person associated by the addressee. When the addresser a of the image data receives the print completion mail, the addresser can know that a copied original has been surely delivered to the addressee b desired by the addresser. From information including the time and the address of the replay of the print completion mail, the addresser a of the image data can know information such as the time and the place of the printout operation which has been performed by the addressee b.

As described above, in the case of confidential dealing, the network copying system performs the process that the password is transmitted by an E-mail to the E-mail address of the addressee b who is the destination (hereinafter, such a process is referred to merely as "mail communication process"). Hereinafter, processes of the image reading device 100 and the printer 300 will be described with reference to flowcharts.

Figure 3:
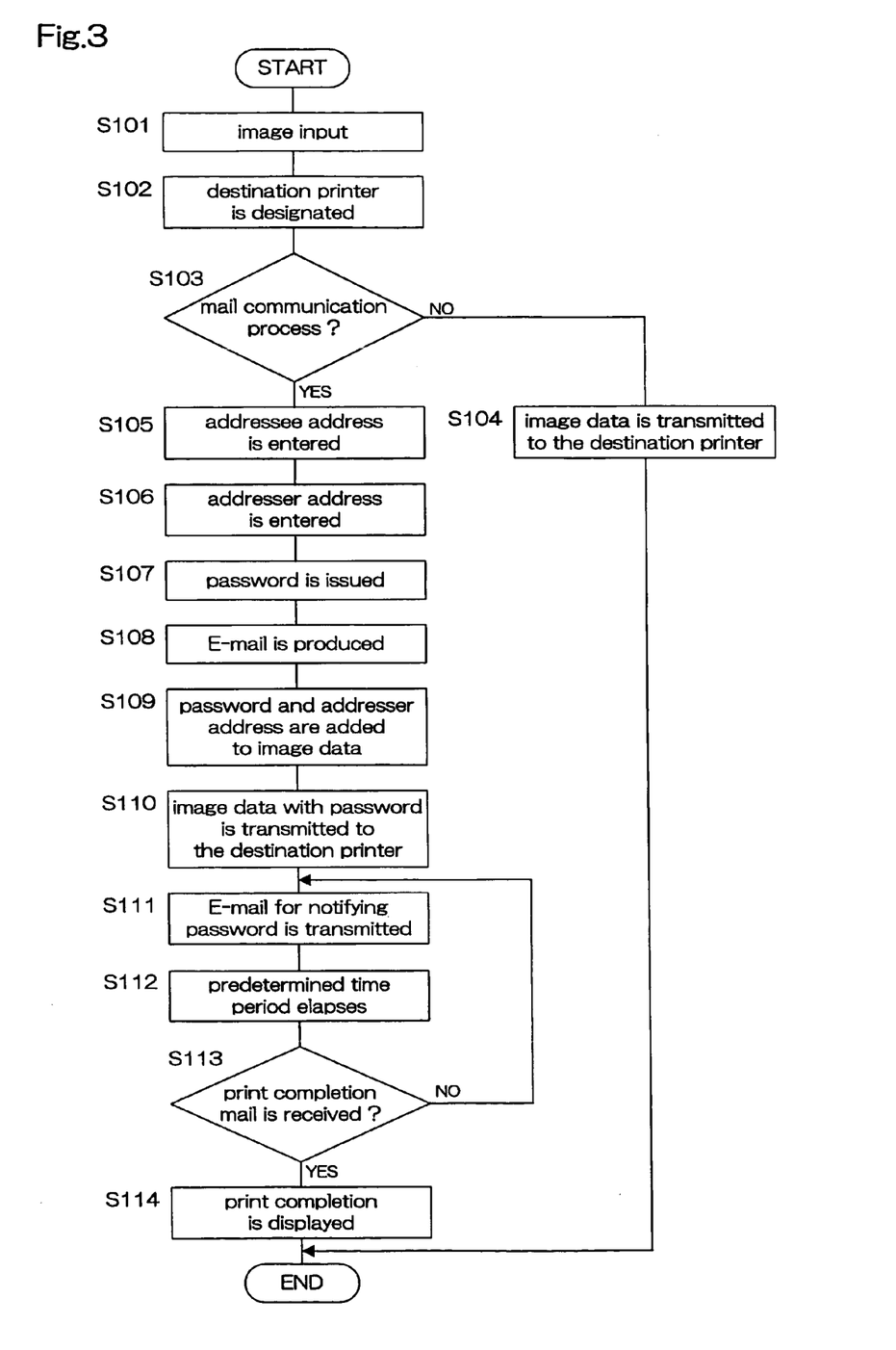
FIG. 3 is a flowchart showing a process of transmitting image data (first embodiment)

FIG. 3 is a flowchart showing the contents of the process of transmitting image data by the image reading device 100. When the network copying function is selected in the instruction section 102, the image reading device 100 is set to a mode in which image data obtained by reading an original are transmitted.

The input section 101 reads an original to produce image data. As a result, the image data are input into the image reading device 100 (S101).

In the instruction section 102, the destination printer to which the input image data are to be transmitted is designated (S102). The designation of the destination printer can be performed by entering the address of the printer. In the image reading device 100, candidates for a printer to which image data are to be transmitted may be set by initialization. For example, plural printers which can be used as the destination printer may be displayed on the touch panel of the instruction section 102, and a desired printer to which the image data are to be transmitted may be arbitrarily selected from the displayed printers. Plural printers may be selected as the destination printer. This is convenient for the case where a copied original is to be transmitted to plural places on the basis of the same image data.

The control section 108 reads out the data stored in the storage section 104, and judges whether instructions for a mail communication process have been given or not (S103).

If instructions for a mail communication process have not been given (S103: NO), the usual network copying function is selected. In this case, the image output section 105 reads out the data stored in the storage section 104 and outputs the data to the interface section 106. The interface section 106 converts the image data in accordance with a protocol suitable for the network 500, and transmits the converted data to the destination printer via the network 500 (S104). The destination printer performs a printout operation on the basis of the image data. The image data may be any kind of data for outputting an image, and may be data described by a page-description language, in place of bit map data.

By contrast, if instructions for a mail communication process have been given (S103: YES), a mode in which the destination of the E-mail is entered is selected. A specific addressee who is enabled to perform a printout operation on the basis of the transmitted image data is selected, and the E-mail address of the addressee is entered (S105).

In place of entering the E-mail address of the addressee b in the instruction section 102, the addressee b may be specified in accordance with the result of the selection of the destination printer 300, and the E-mail address may be determined. In the case where only the addressee b usually uses the destination printer 300, for example, the addressee is specified in accordance with the result of the selection of the destination printer 300, and the E-mail address of the addressee is then uniquely determined. Also in the case where the destination printer 300 is shared by plural persons (for example, the entire staff of an office) and the person to whom the addresser instructing transmission of the image data is to transmit the image data is usually a specific one of the plural persons (for example, the person who is in charge of negotiating with the addressee a), the addressee is specified in accordance with the result of the instruction of the destination printer 300 and the E-mail address is uniquely determined.

The E-mail address of the addressee can be determined in accordance with the result of the selection of the destination printer as described above, by correlatively storing printers to be selected, and E-mail addresses of addressees who use the printers. For example, the following configuration may be used. A file for all the printers in which pointers of the users of the printers are recorded, and that of E-mail addresses of all the users are prepared. When a destination printer is selected, the control section 108 searches the printer file stored in the storage section 104, and then automatically accesses the data of the E-mail address.

Next, the E-mail address of the addresser who gives instructions for the transmission of the image data is entered as required (S106). The E-mail address of the addresser is necessary in the case where the print completion mail which is transmitted as a reply when a printout operation is completed on the reception side is to be received by the PC 200 which is used by the addresser, or the like.

Next, a password specifying the image data is set (S107). A new password may be set for each copy job. A serial number, or the time when the password is set may be used as the password. In place of specially setting a password, the transmission time of the E-mail which is transmitted to the E-mail address of the addressee may be used as the password. For example, usually, a character string or a symbol string in which an ID number of the transmission side (including address information) and the transmission time of an E-mail are combined with each other may be used as a simple password because any person other than concerned persons does not know such a string.

The mail output section 107 produces an E-mail for notifying the addressee of the set password (S108). The E-mail may contain job information in addition to the password. The job information includes the number of original sheets, the name of the destination printer, the E-mail address of the addresser, and the like. For example, the input section 101 may detect the number of original sheets when it reads the original, and the result of the detection of the number of original sheets may be used as it is as the contents of the E-mail.

The image output section 105 adds the set password to the image data (S109). Furthermore, the E-mail address of the addresser is added to the image data. For example, the process of adding the password to the image data may be performed by adding password information to the header portion of usual image data. Image data to which a password is added has a high degree of security. Therefore, an encryption process may be applied to the image data by a well-known encryption technique.

The interface section 106 transmits the image data to which the password is added, to the destination printer 300 (S110). With being interlocked with the transmission of the image data, the password notification E-mail for notifying the contents of the password is automatically transmitted to the E-mail address of the addressee b (S111). As a result, the addressee can receive the E-mail through the PC 400 which is used by the addressee. From the E-mail, the addressee b can know the fact that image data of confidential dealing and addressed to the addressee oneself have been transmitted, and also the password which is requested to be entered as a condition for starting image formation based on the image data received by the printer 300.

The addressee who has known the password moves to the place where the printer 300 which is designated by the E-mail is placed, and then enters the password into the printer 300. As a result, the printer 300 performs a printout operation. The printer 300 transmits as a reply a print completion mail for notifying the addresser a of the completion of the printout. The print completion mail is transmitted to the PC 200 which is used by the addresser a, or the image reading device 100 which has transmitted the image data.

The image reading device 100 receives the print completion mail via the interface section 106 (S113). If a print completion mail is not received even after a predetermined time period elapses (S112, and S113: NO), the E-mail is again transmitted (S111) to request the addressee to perform a printout operation.

When the print completion mail is received, a message indicating that the printout operation based on the transmitted image data has been completed is displayed on the display section 103, and the process of the image reading device 100 is ended (S114).

Figure 4:
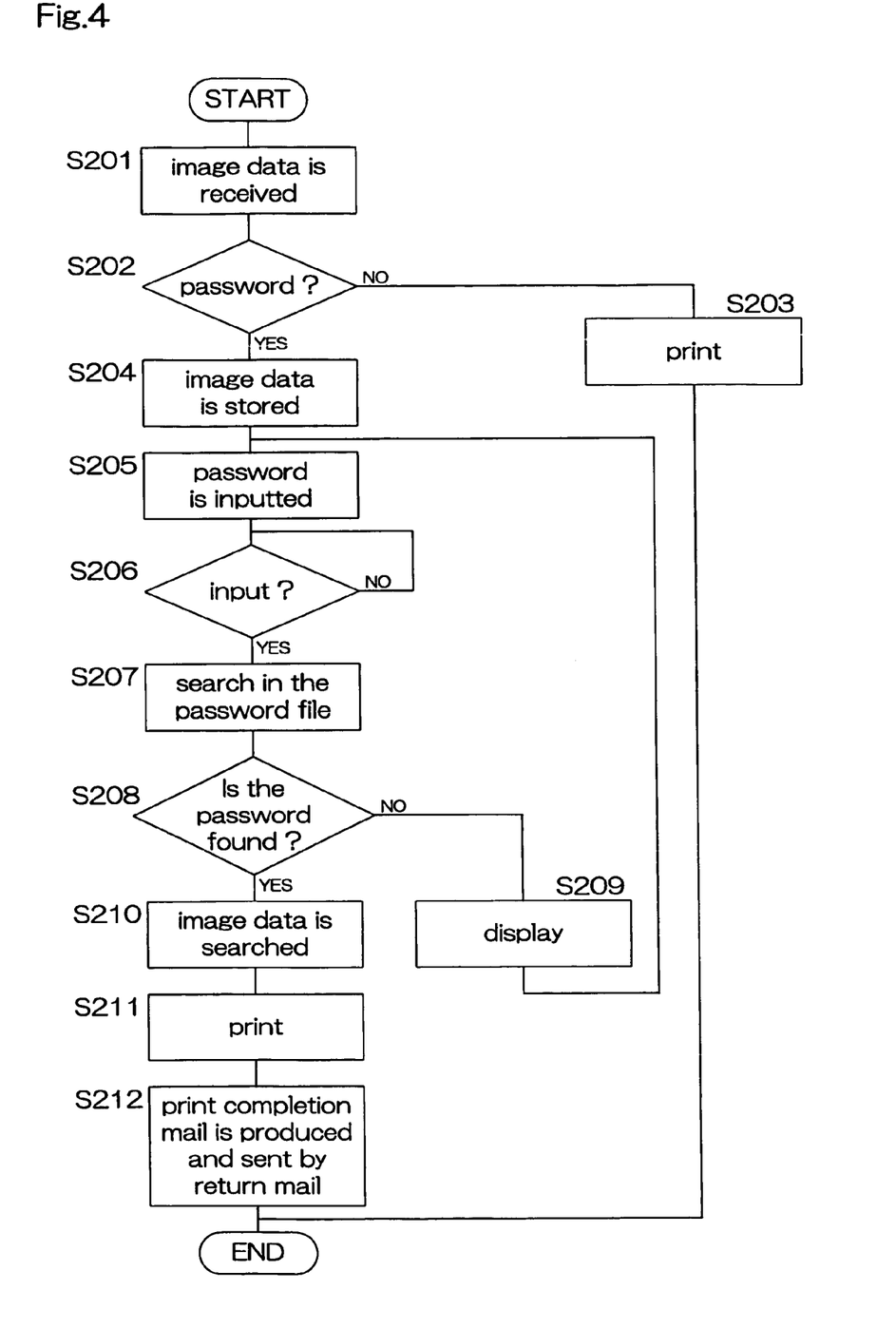
FIG. 4 is a flowchart showing a process of receiving image data (first embodiment)

FIG. 4 is a flowchart showing the contents of the process of the printer 300 which receives the image data and prints out the data.

The printer 300 receives the image data from the image reading device via the network 500 (S201). The printer 300 judges whether a password is added to the received image data or not (S202). If a password is not added to the image data (S202: NO), confidential dealing is not requested and the image data are not secret. Therefore, the printer 300 performs an operation of printing the data onto a printing sheet (S203).

By contrast, if a password is added to the image data (S202: YES), the printer 300 inhibits printout on a printing sheet, and the image data are stored in a storage region such as a memory or a hard disk drive disposed in the printer 300 (S204). For example, the printer 300 may extract the contents of the password, and information of the E-mail address of the addresser a from the image data to which the password is added, and store such information distributedly into an image data file, a password file, and an E-mail address file. The image data, the password, and the E-mail address can be stored with being correlated with one another, by setting pointers in the storage region.

The printer 300 is set to a mode in which entering of a password is enabled (S205), and enters the state of waiting entering of a password (S206). When a character or symbol string is entered into the printer 300 (S206: YES), data in the file storing passwords in the printer 300 are checked (S207), and it is judged whether there is a password matching the character string or the like or not (S208).

If there is not a password matching the entered character string or the like (S208: NO), it is judged that the entered character string or the like is not a password. Therefore, the condition for starting an printout operation based on the received image data is not satisfied. Consequently, "NO CORRESPONDING IMAGE" or "AGAIN ENTER PASSWORD" is displayed (S209), and an printout operation is not performed. As a result, persons other than the addressee to whom the password has been informed by the E-mail, and concerned persons to whom the password is notified by the addressee are inhibited from giving instructions for an printout operation.

By contrast, if the password is entered by the addressee to whom the password has been informed by the E-mail, or a concerned person (S206: YES), data in the file storing passwords in the printer 300 are checked (S207), and it is judged that there is a password matching the entered password (S208: YES). Therefore, the condition for starting an printout operation based on the received image data is satisfied. As a result, image data specified by the password is retrieved (S210), and a printout operation is performed based on the image data (S211). After this process, the addressee can obtain a copied original.

The printer 300 produces a print completion mail, and transmits as a reply the produced print completion mail in response to completion of the printout operation (S212). The printer 300 may read out the E-mail address of the addresser from the memory, and use the read out address as it is, as the destination of the print completion mail. The printer 300 may notify the print completion to the image reading device from which the image data have been transmitted.

<Second Embodiment>

In the image reading device 100 of the first embodiment, the password which is notified to the addressee by an E-mail is a password which is requested to be entered as a condition for starting image formation based on the image data received by the printer 300. Therefore, the image reading device 100 sets a password, and, in an initial stage of the process, transmits image data to which the set password is added, to the destination printer 300. By contrast, in the image reading device 100 of the second embodiment, a password which is to be notified to the addressee by an E-mail is a password which is requested to be entered as a condition for starting transmission of image data from the image output section 105 by the image reading device 100. Consequently, the image reading device 100 first transmits the set password by an E-mail to notify the addressee of the password. Thereafter, the image reading device 100 transmits image data under the condition that the password is entered into the printer 300 by the addressee to whom the password has been notified.

The configuration of the image reading device of the second embodiment is in common with that shown in FIG. 1, and connections in the case where a network copying device is configured by using the image reading device are in common with those shown in FIG. 2. Therefore, detailed description of the configuration is omitted. The components are designated by the same reference numerals as those used in the first embodiment.

Figure 5:
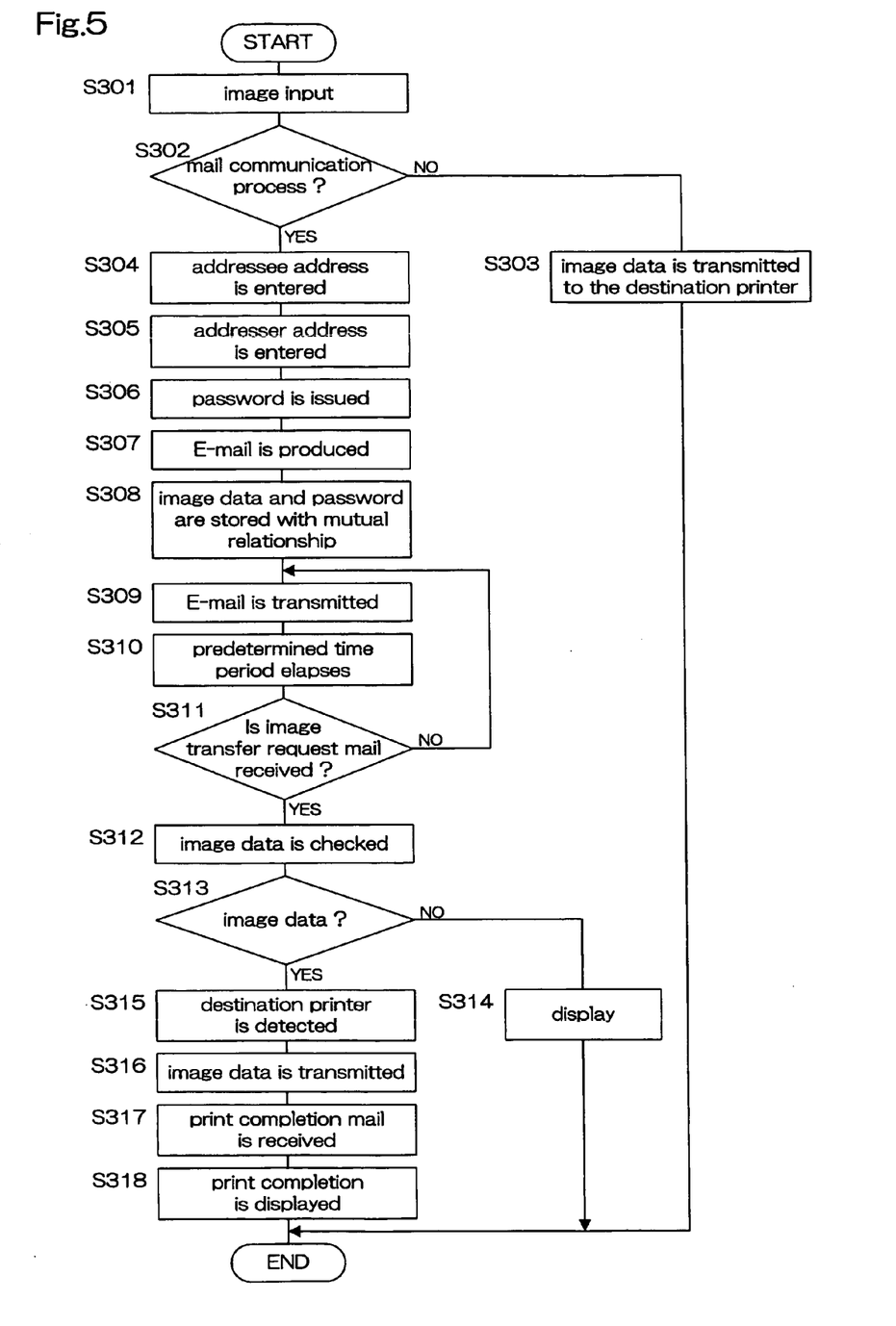
FIG. 5 is a flowchart showing a process of transmitting image data (second embodiment)

FIG. 5 is a flowchart showing the contents of the process of transmitting image data by the image reading device 100.

In the same manner as the first embodiment, when the network copying function is selected in the instruction section 102, the mode in which image data obtained by reading an original are transmitted is selected.

The input section 101 reads an original to produce image data. As a result, the image data are input into the image reading device 100 (S301). If instructions for a mail communication process have not been given (S302: NO), the usual network copying function is selected, and the image data are transmitted (S303).

By contrast, if instructions for a mail communication process have been given (S302: YES), the E-mail address of an addressee who is enabled to perform a printout operation is entered in the instruction section 102 (S304). The E-mail address of the addresser who gives instructions for the transmission of the image data is entered as required (S305).

Next, the control section 108 sets a password (S306). Alternatively, in place of specially setting a password, the transmission time of the E-mail which is transmitted to the E-mail address of the addressee may be used as the password. The mail output section 107 produces an E-mail for notifying the addressee of the set password (S307). The E-mail may contain job information in addition to the password. The storage section 104 stores the password and the image data with correlating them with one another (S308). For example, the storage section 104 has a password file and an image data file, and stores the password and the image data so that the image data can be accessed on the basis of the password by using a set pointer.

Next, the mail output section 107 transmits the password notification E-mail via the interface section 106 to the addressee who is allowed to perform a printout operation (S309). The addressee receives the password notification E-mail through the PC 400.

As a result, the password is notified to the addressee. The password is a password which is entered as a condition for starting transmission of the image data from the image output section 105 by the image reading device 100. Therefore, another person who does not know the password cannot receive the transmission of the image data from the image output section 105.

The addressee selects the printer 300 which is to receive the image data, and enters the password into the printer 300. Unlike the first embodiment, the addressee can arbitrarily selects the printer 300. The printer 300 into which the password is entered produces an image transmission request E-mail for requesting transmission of the image data, and transmits the produced image transmission request mail to the image reading device 100.

The image reading device 100 judges whether the image transmission request mail from the printer 300 has been received or not (S311). If an image transmission request mail is not received even after a predetermined time period elapses (S310, and S311: NO), the E-mail is again transmitted to the E-mail address of the addressee via the interface section 106 and the network 500 (S309). By the retransmission of the E-mail, the addressee is again informed of the fact that transmission of image data addressed to the addressee is ready, and the contents of the password for requesting transmission of the image data.

By contrast, if the image transmission request mail has been received (S311: YES), the control section 108 detects the password attached to the image transmission request mail, and searches the password file which is temporarily stored in the storage section 104 (S312). If there is not a matching password (S313: NO), it is shown that the data entered into the printer 300 do not contain the password. Therefore, notification that there is no corresponding image, or that a password should be again entered is given to the printer 300 (S314). The notification such as that there is no corresponding image may be performed by transmitting form documents stored in the storage section 104, as a print job to the printer 300. Alternatively, such notification to the printer 300 may be made by an E-mail.

By contrast, if there is a password matching the password attached to the image transmission request mail (S313: YES), the control section 108 retrieves image data corresponding to the password, and reads out the image data from the image data file. Furthermore, the control section detects the destination printer to which the image data are to be transmitted, on the basis of the address information contained in the image transmission request mail (S315). The image reading device 100 transmits the image data to the detected destination printer 300 via the interface section 106. The printer 300 which has received the image data performs an printout operation on the basis of the image data. As a result, the addressee can obtain a copied original.

In the same manner as the first embodiment, the printer 300 transmits as a reply the print completion mail to the PC 200 which is used by the addresser of the image data, or to the image reading device 100 which has transmitted the image data. When the image reading device 100 receives the print completion mail, a message indicating that the printout operation has been completed is displayed (S317 and S318).

As a result, the addresser can know that the printout operation based on the transmitted image data has been completed.

Figure 6:
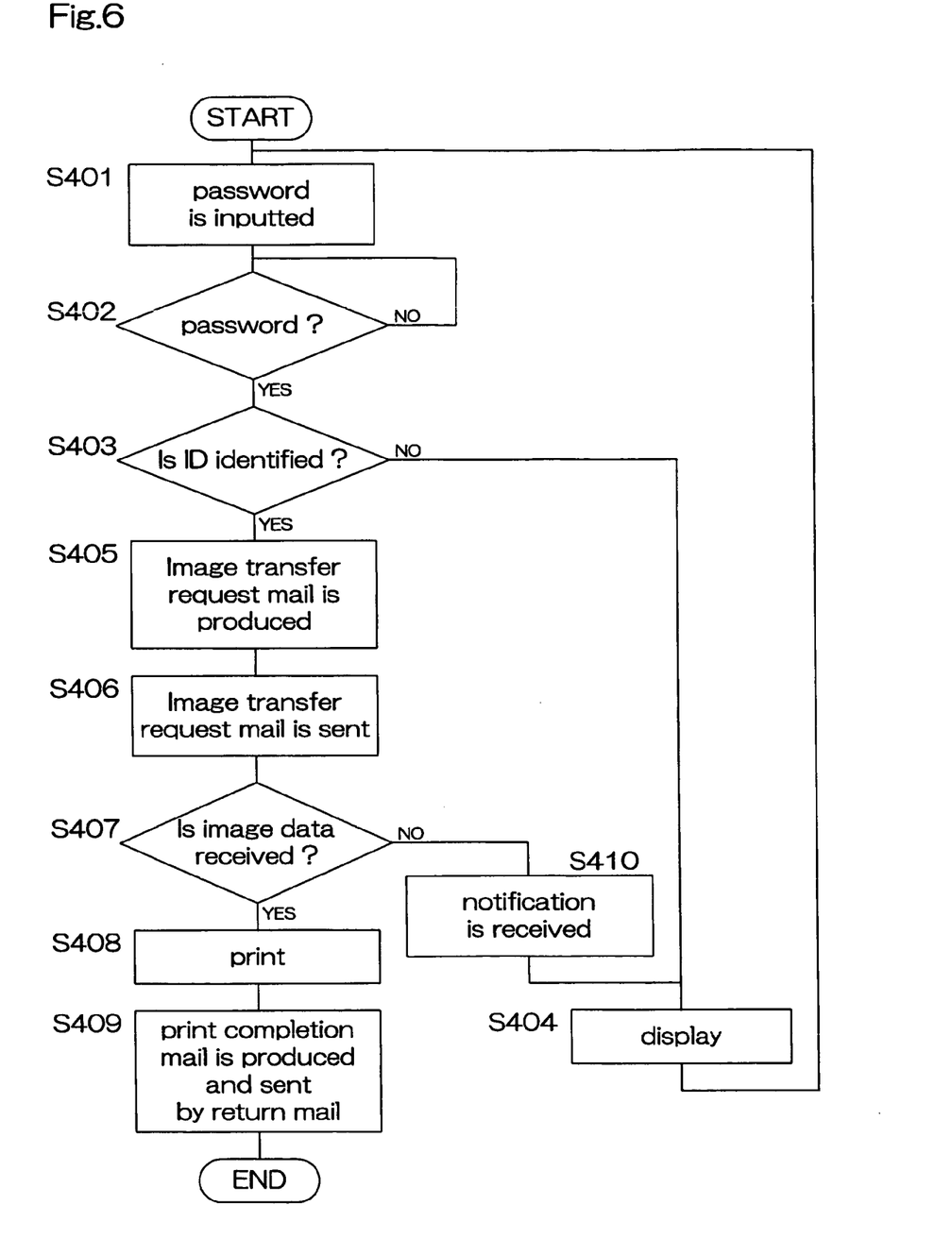
FIG. 6 is a flowchart showing a process of receiving image data (second embodiment).

FIG. 6 is a flowchart showing the contents of the process of the printer 300 which receives the transmission of the image data from the image reading device 100 under the condition that the password is entered.

Usually, the printer 300 is set to a mode in which a password is received (S401), and enters the state of waiting entering of a password (S402). When a password and the like are entered into the printer 300 (S402: YES), the following processes are performed. A combination of an ID number (including address information) for identifying the image reading device 100 to which transmission of the image data is to be requested, and the transmission time and date of the password notification E-mail may be used as a password. The printer 300 knows the image reading device 100 to which transmission of the image data is to be requested, from the entered password. When a character string or the like which does not match the password is entered, therefore, the printer cannot know the image reading device 100 (S403: NO). Therefore, a warning that there is no corresponding image, or that a password should be again entered is displayed (S404). By contrast, if the image reading device can be known from the entered character string (S403: YES), the printer 300 produces the image transmission request mail (S405). The printer 300 transmits the produced image transmission request mail to the image reading device 100 (S406). As a result, the image data corresponding to the entered password are transmitted from the image reading device 100. If the requested image data are received (S407: YES), the printer 300 performs a printout operation based on the image data (S408). The printer 300 produces a print completion mail for notifying the completion of the printout. The produced print completion mail is transmitted as a reply to the address of the image reading device 100 or the E-mail address of the addresser (S409).

By contrast, if data not matching the password are entered and hence the image data specified by the password do not exist in the image reading device 100, image data transmission from the image reading device 100 is not performed. In this case, the printer 300 cannot receive image data (S407: NO), and receives notification that there is no corresponding image (S410). As a result, a warning that there is no corresponding image, or that a password should be again entered is displayed in the printer 300 (S404). The warning that there is no corresponding image may be displayed on the display section of the printer 300. Alternatively, the warning that there is no corresponding image may be printed onto a printing sheet.

As described above, the image reading device which has been described in the first or second embodiment transmits image data which are obtained by reading an original, to another printer, and is characterized in that a password specifying the image data to be transmitted is set and the password is transmitted by an E-mail. As shown in the first embodiment, the password may be a password which is requested to be entered as a condition for starting image formation based on the image data received by the printer, a print server, or the like. Alternatively, as shown in the second embodiment, the password may be a password which is requested to be entered as a condition for starting image data transmission by the image output section 105.

An E-mail address to which the password is to be notified by an E-mail may be determined in accordance with the result of the selection of the printer to which the image data are to be transmitted. The transmission of the image data, and that of the E-mail can be performed in an interlocked manner. In the image forming system, therefore, the burden on the addresser is reduced and transmission of the E-mail from the addresser is surely performed, as compared with the case where, in addition to a process of transmitting image data, an application software for transmitting an E-mail is activated in a terminal device such as a computer to newly produce an E-mail, and the transmission of the image data and the password are notified.

A nonvolatile memory may be used as the storage section 104. In this case, even when the power source is turned off before the printout operation is performed, data (history) remain in the memory, and the image data can be transmitted in accordance with the data after the power source is again turned on.

In the above, the image reading devices in which image data are obtained by reading an original have been described. The invention can be applied also to an image communicating device other than such an image reading device. Namely, it is apparent that the invention can be applied also to the case where image data which are produced by a process other than reading of an original are transmitted.

The network for transmitting image data may be different from that for transmitting an E-mail. For example, image data may be transmitted via a LAN within an organization, and the E-mail may be transmitted via the Internet.

In the above, the example in which the image data receiver which receives image data is a printer has been described. The image data receiver is not restricted to a printer, and may be a digital copier or a print server computer. Furthermore, in the above, the example in which the destination of an E-mail for transmitting the contents of a password is a PC has been described. The destination of an E-mail is not restricted to a PC, and may be any information communication terminal which is configured so as to receive an E-mail.

It is apparent that those skilled in the art can implement the data communication method having the process steps shown in FIGS. 3 and 5, on the basis of the above description. It is apparent also that the processes shown in FIGS. 3 and 5 can be realized by causing a computer or the like to read a computer-readable recording medium on which the process steps shown in FIG. 3 or 5 are stored.

In the embodiments described above, it is not required to perform notification of the password which is set with respect to image data with a high degree of security, by telephone or by separately activating an E-mail transmission application software, whereby the burden on the addresser is reduced. Furthermore, the password can be surely notified to the addressee to whom the password must be informed. Only the addressee to whom the password is notified by an E-mail via the mail transmitter can give instructions for image formation, and another person cannot give instructions for image formation. In other words, in the case where image information is once performed, when the password is entered by a specific addresser to whom the password is notified by an E-mail, or person associated by the addressee, it is possible to presume that instructions for image formation is given by means of E-mail. Since the transmitter which receives completion notification which is transmitted in reply to the entering of the password and image formation is disposed, it is possible to presume that a copied original has been delivered to the specific addressee. Therefore, the addresser is not required to separately inquire about completion of reception of a copied original, by telephone or the like, and the burden on the addresser is remarkably reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming method comprising the steps of:
    obtaining image data and producing a password;
    receiving designation of a destination printer and designation of an addressee;
    transmitting the image data and the password to the designated printer, and separately transmitting the password without the image data to the designated addressee by an E-mail; and
    if the password transmitted by E-mail is entered into the printer and the password entered into the printer matches the password transmitted together with the image data, performing printing on the basis of the image data.

2. An image forming system comprising:
    a scanner that reads an image and generates image data, said scanner adapted to receive designation of a destination printer and designation of an addressee, and said scanner adapted to transmit the read image data and the password to the designated printer and said scanner adapted to transmit the password without the image data to the designated addressee by an electronic mail separately from the transmission of the read image data and the password to the designated printer; and
    a printer that prints on the basis of the image data in case that a password which is entered into the printer by a user matches with the password transmitted together with the image data.

3. An image communicating apparatus which is adapted to be connected to an image data receiving device via a network, wherein said image communicating device comprises:
    a setting unit which is adapted to set a password specifying image data to be transmitted;
    an image data transmitter which is adapted to transmit the specified image data and the set password to said image data receiving device; and
    a mail transmitter which is adapted to transmit the set password without the image data by an E-mail to an address corresponding to a device other than the image data receiving device, wherein the mail transmitter is adapted to transmit the set password separately from the transmission of the set password and the image data by the image data transmitter.

4. The image communicating apparatus according to claim 3, wherein the password is a password which is requested to be entered as a condition for starting image formation based on the image data received by the image data receiving device.

5. The image communicating apparatus according to claim 4, further comprising:
    a receiving unit which receives a completion notification which is transmitted in reply to entering of the password and image formation.

6. The image communicating device according to claim 3, wherein the password is a password which is requested to be entered as a condition for starting image data transmission by said image data transmitter.

7. The image communicating apparatus according to claim 3, further comprising an address entering unit which enters a destination address of the E-mail.

8. The image communicating apparatus according to claim 3, further comprising:
 a selector which selects an image data receiving device to which the image data are to be transmitted, from plural image data receiving devices which are connected to one another via the network; and
 a determining member which determines a destination of the E-mail by the mail transmitter, in accordance with a result of the selection by the selector.

9. An image reading apparatus which is to be connected to an image data receiving device via a network, wherein said image reading device comprises:
 a reading unit which is adapted to read an original;
 a setting unit which sets a password specifying the image data to be transmitted;
 an image data transmitter which is adapted to transmit image data, which are obtained by reading the original, and the set password to the image data receiving device; and
 a mail transmitter which transmits the set password without the image data by an E-mail to a device other than the image data receiving device, wherein the mail transmitter is adapted to transmit the set password separately from the transmission of the set password and the image data by the image data transmitter.

10. An image forming system having an image communicating device which performs communication of image data, an image forming device which forms an image on a printing sheet based on the received image data, and an E-mail receiving device,
 wherein said image communicating device comprises:
 a setting unit which sets a password specifying the image data to be transmitted;
 an image data transmitter which is adapted to transmit the image data and the set password to said image forming device via a network; and
 a mail transmitter which transmits the set password without the image data to an address of said E-mail receiving device by an E-mail, wherein the mail transmitter is adapted to transmit the set password separately from the transmission of the set password and the image data by the image data transmitter; and
 wherein said image forming device comprises:
 a receiver which is adapted to receive the image data and the set password transmitted by said image communicating device;
 a storage which is adapted to store the received image data;
 an image forming unit which is adapted to form an image on a printing sheet based on the image data stored in said storage;
 a receiving unit which is adapted to receive the set password; and
 a controller which controls said image forming unit based on whether the set password is received or not.

11. An image communication method of communicating image data via a network, comprising the steps of:
 transmitting image data to a first device;
 setting a password specifying the image data to be transmitted; and
 transmitting the set password without the image data by an E-mail to a second device.

12. A computer-readable recording medium on which procedures of communicating image data via a network are recorded, wherein a program is recorded on the recording medium, the program causing the computer to implement the steps of:
 transmitting image data to a first device;
 setting a password specifying the image data to be transmitted; and
 transmitting the set password without the image data by an E-mail to a second device.

13. An image forming method comprising the steps of:
 obtaining image data and producing a password;
 transmitting the image data and the password to a designated printer;
 transmitting the password without the image data to a designated addressee by an E-mail; and
 if the password transmitted by E-mail is entered into the designated printer and the password matches the password transmitted together with the image data, performing printing on the basis of the image data.

14. An image forming method, comprising:
 identifying a printer as a designated printer;
 transmitting image data to the designated printer;
 transmitting certification information without the image data to a designated addressee via an e-mail; and
 printing the image data on the designated printer if the certification information is approved.

15. An image forming method, comprising:
 transmitting certification information without image data to an addressee at a first computer via e-mail;
 inputting the certification information to a designated printer;
 confirming the certification information; and
 printing image data by the designated printer that the designated printer received from a second computer if the certification information is approved.

* * * * *